(12) United States Patent
Farwell

(10) Patent No.: US 6,671,754 B1
(45) Date of Patent: Dec. 30, 2003

(54) TECHNIQUES FOR ALIGNMENT OF MULTIPLE ASYNCHRONOUS DATA SOURCES

(75) Inventor: William D. Farwell, Thousand Oaks, CA (US)

(73) Assignee: Raytheon Company, Lexington, MA (US)

( * ) Notice: Subject to any disclaimer, the term of this patent is extended or adjusted under 35 U.S.C. 154(b) by 519 days.

(21) Appl. No.: 09/637,524

(22) Filed: Aug. 10, 2000

(51) Int. Cl.[7] .................................................. G06F 3/05
(52) U.S. Cl. ......................... 710/61; 710/36; 713/400; 713/600
(58) Field of Search ............................. 710/7, 1, 20, 58, 710/60, 61, 15, 18, 36, 45; 713/400, 600, 502

(56) References Cited

U.S. PATENT DOCUMENTS

| | | | | |
|---|---|---|---|---|
| 4,310,840 A | * | 1/1982 | Williams et al. ............ | 340/724 |
| 4,987,572 A | * | 1/1991 | Scott ........................... | 370/91 |
| 5,533,072 A | * | 7/1996 | Georgiou et al. ............ | 375/371 |
| 5,668,830 A | * | 9/1997 | Georgion et al. ............ | 375/220 |
| 6,266,727 B1 | * | 7/2001 | Smyers et al. ............... | 710/105 |
| 6,271,777 B1 | * | 8/2001 | Lentine et al. ............... | 341/100 |
| 6,363,428 B1 | * | 3/2002 | Chou et al. .................. | 709/232 |

* cited by examiner

*Primary Examiner*—Jeffrey Gaffin
*Assistant Examiner*—Rijue Mai
(74) *Attorney, Agent, or Firm*—Leonard A. Alkov; Glenn H. Lenzen, Jr.

(57) ABSTRACT

Techniques for converting input data from a multiplicity of sources that are mutually asynchronous, to a single, common synchronous format for local processing by an information processor. Logical operations are described which control first-in-first-out ("FIFO") buffers to align all inputs to a predetermined point in the data flow or processing sequence, and which maintain clock-by-clock alignment of the input data sequences for an indefinite period of time thereafter.

11 Claims, 6 Drawing Sheets

TECHNIQUES FOR ALIGNMENT OF MULTIPLE ASYNCHRONOUS DATA SOURCES

This invention was made with Government support under a Government contract. The Government has certain rights in this invention.

TECHNICAL FIELD OF THE INVENTION

This invention relates to information processors that receive input data from a multiplicity of sources, and more particularly to techniques for alignment of the data.

BACKGROUND OF THE INVENTION

The invention applies to any processing system where multiple asynchronous data sources are used in a coordinated manner. Such processing systems include multiple, parallel processors sharing computational load, multiple processors operating redundantly for fault tolerance via real time comparison or voting, and systems requiring high bandwidth data distribution using multiple links to share data.

SUMMARY OF THE INVENTION

Techniques are described for converting input data from a multiplicity of sources that are mutually asynchronous, to a single, common synchronous format for local processing by an information processor. In accordance with an aspect of the invention, a set of logical operations is described which control first-in-first-out ("FIFO") buffers to align all inputs to a predetermined point in the data flow or processing sequence, and which maintain clock-by-clock alignment of the input data sequences for an indefinite period of time thereafter.

Thus, in accordance with an aspect of the invention, a method is described for converting input data from a multiplicity of data sources that are mutually asynchronous, to a single, common synchronous format. The method comprises:
  receiving each asynchronous data input from each of the data sources in a respective first-in, first-out buffer (FIFO) device;
  controlling the readout of data from the respective FIFO devices to provide a microtiming function to assure that sequential samples of data from the asynchronous data sources step together, one at a time out of their respective FIFOs without loss of registration, and to provide a macrotiming function to initially align a predetermined start point of a sequence of data among all of the data sources.

In accordance with another aspect of the invention, a system is described for converting input data sequences from a multiplicity of data sources that are mutually asynchronous, to a single, common synchronous format. The system includes a set of first-in-first-out (FIFO) buffer devices, connected to receive the data input sequences from the data sources. A control logic system controls readout of data from the FIFO buffer devices, and includes macrotiming circuitry for aligning all data inputs to a predetermined point in data flow or processing sequence, and microtiming circuitry for maintaining clock-by-clock alignment of the input data sequences.

BRIEF DESCRIPTION OF THE DRAWINGS

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENTS

In accordance with an aspect of the invention, many asynchronous inputs for a processing system are converted to a common clock system with mutual alignment.

In the processing sequence, word n from each of the converted inputs occurs on the same clock period at the receiving processor. This is done with several unique attributes, including real time conversion with low latency, hardware efficiency (no large buffers are needed beyond the FIFO size used for a single asynchronous interface), and bandwidth overhead efficiency (typically <0.1%). The conversion is transparent to the user, and employs only minimal software intervention, typically only the insertion of a synchronization code at the beginning of a new data field or processing mode.

In an exemplary embodiment, conventional FIFO (first-in, first-out) devices are employed for the receipt and clock system conversion of each asynchronous input. To these FIFOs is added control logic to control the respective read operations. The control logic performs two functions. One function is that of microtiming, i.e. assuring that sequential samples of data from asynchronous sources step together, one at a time out of their respective FIFOs without loss of registration (e.g., the sample sequence from any source never gets ahead nor falls behind the other sample sequences). The second function is that of macrotiming, i.e., providing a means of initially aligning a predetermined start point of a sequence of data among all of the data sources.

Figure 1A:
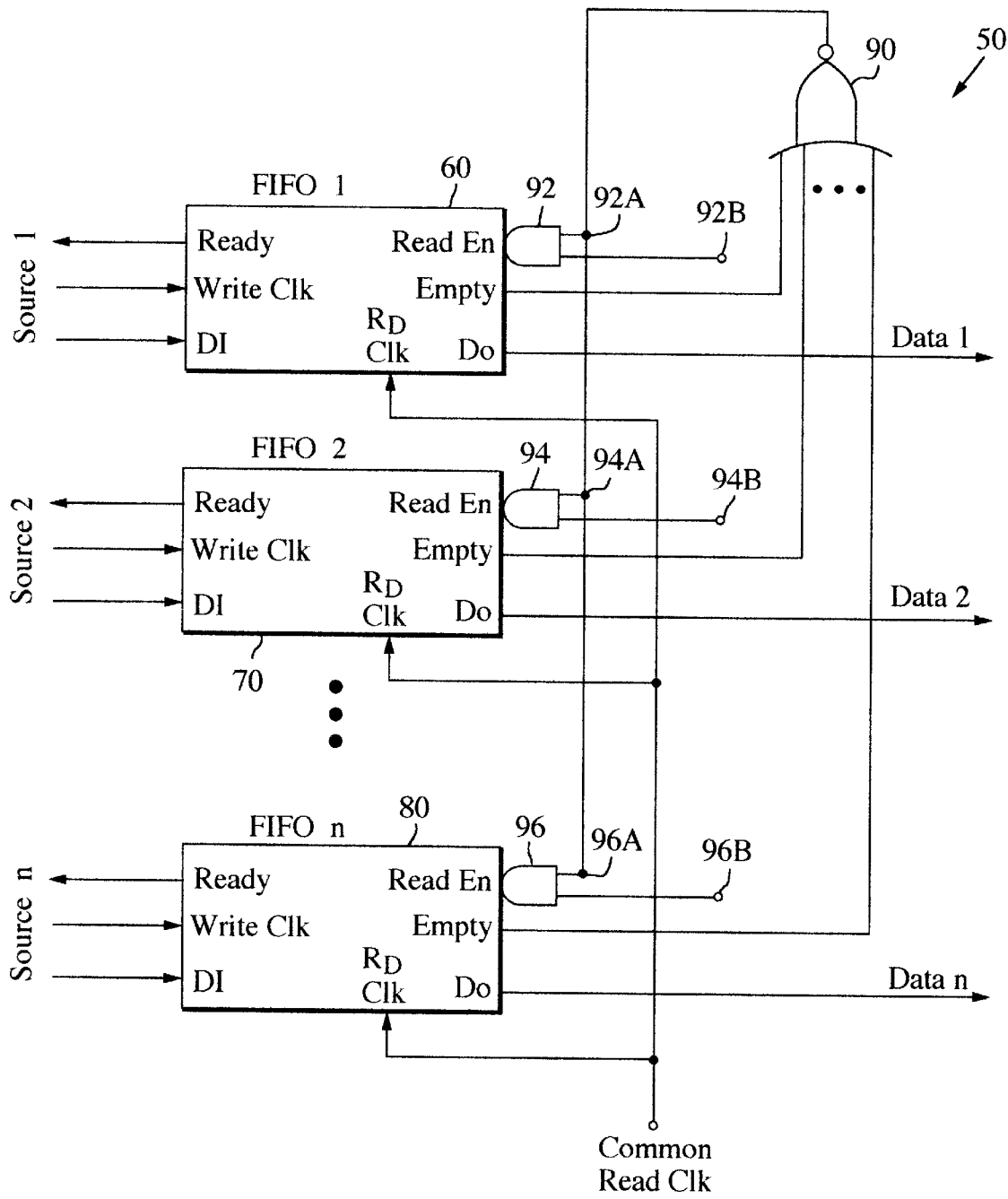
FIG. 1A is a schematic diagram of an exemplary circuit implementation of a microtiming logic in accordance with an aspect of the invention.

FIG. 1A is a schematic diagram of an exemplary circuit implementation in accordance with an aspect of the invention, which illustrates the general microtiming concept. In this example, there are n sources of input data, and for each source, a corresponding FIFO device 60, 70, 80 is provided. The FIFOs are conventional devices, and include a data input port $D_I$ which receives the input data from the respective source, a read enable port, an EMPTY port, a data out port $D_O$ for outputting the FIFO data, a read clock port, a write clock port and a ready port.

The EMPTY signals from each FIFO (indicating the need for more source data to continue) are logically ORed together and inverted at NOR gate 90 to provide a READ ENABLE signal for all of the FIFOs. Thus any active EMPTY signal from any FIFO stops all FIFO read operations until data is again available. When there are no EMPTY signals active, data is read out of all the FIFOs in a lock-step manner by the common READ CLOCK. A faster source eventually fills its FIFO, causing an inhibition of the ready signal back to that source, turning it off until the FIFO again has room, a standard handshake protocol. Thus all sources are throttled to match the slowest source, and all data remain in step.

Figure 2A:
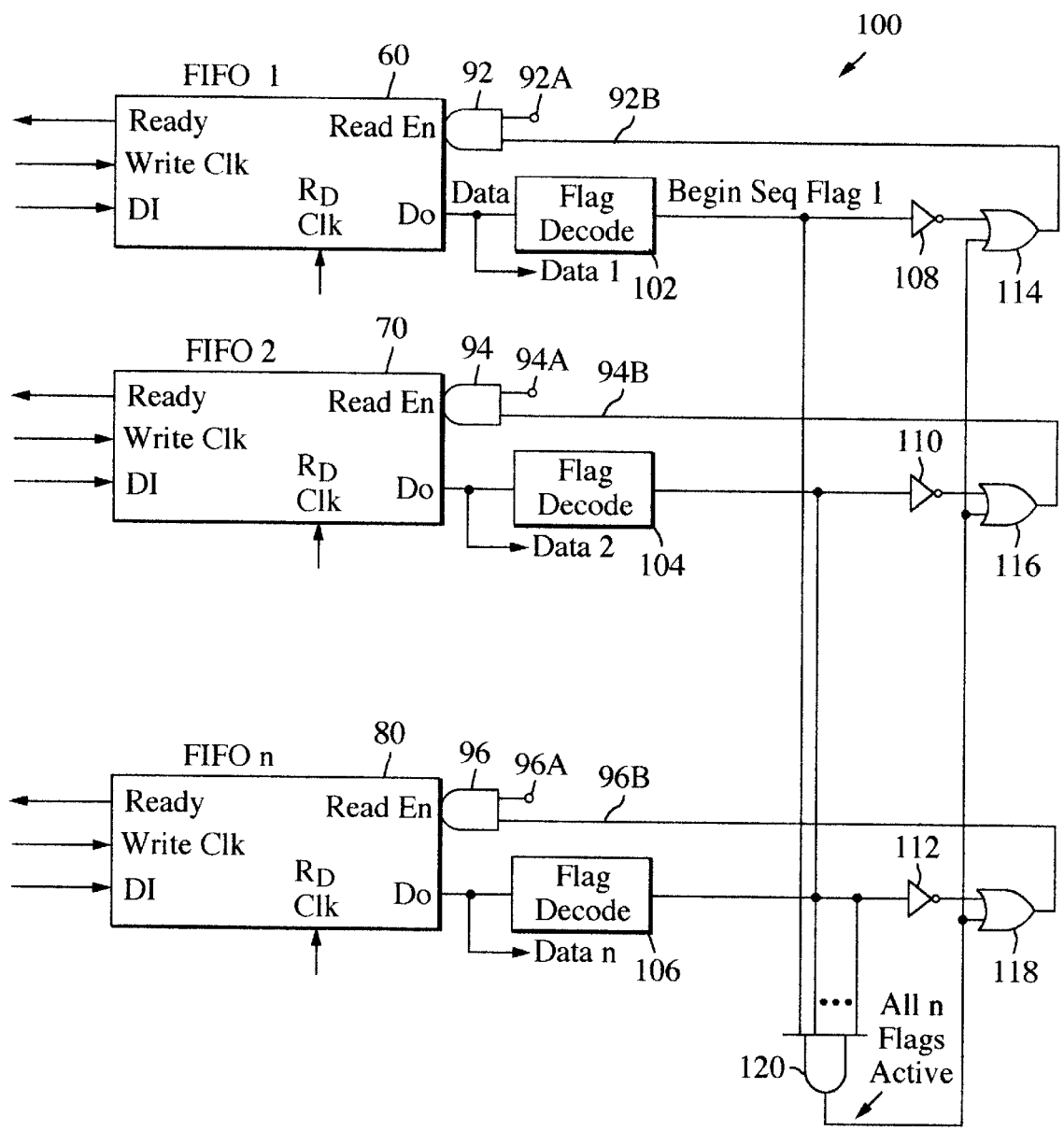
FIG. 2A illustrates schematically a macrotiming function in accordance with an aspect of the invention.
Figure 2B:
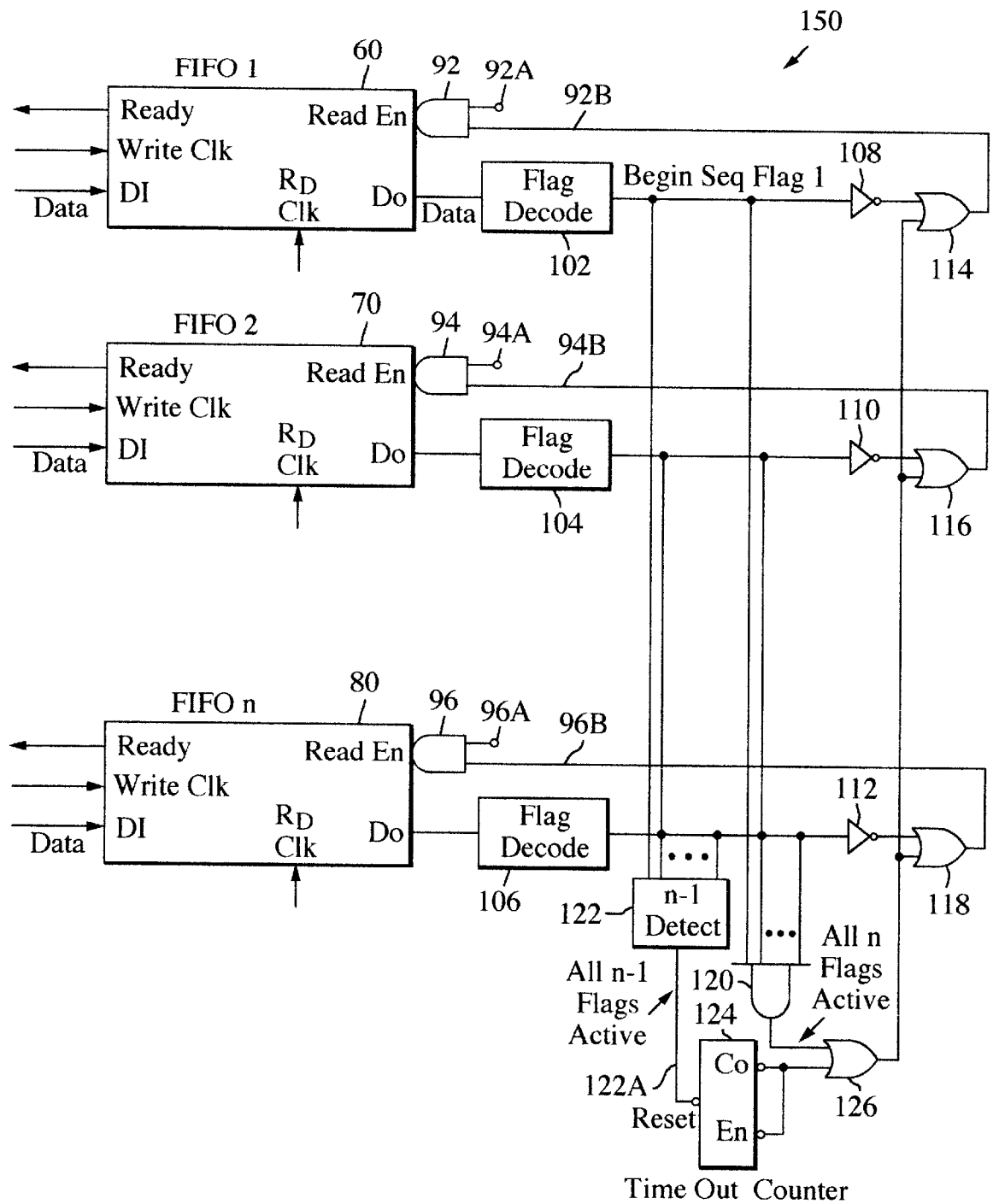
FIG. 2B illustrates an exemplary circuit implementation illustrating an alternative embodiment of a macrotiming function in accordance with an aspect of the invention.

The READ ENABLE signal from the NOR gate 90 is ANDed by respective AND gates 92, 94, 96 with a signal from the macrotiming logic shown in FIG. 2B.

Figure 1B:
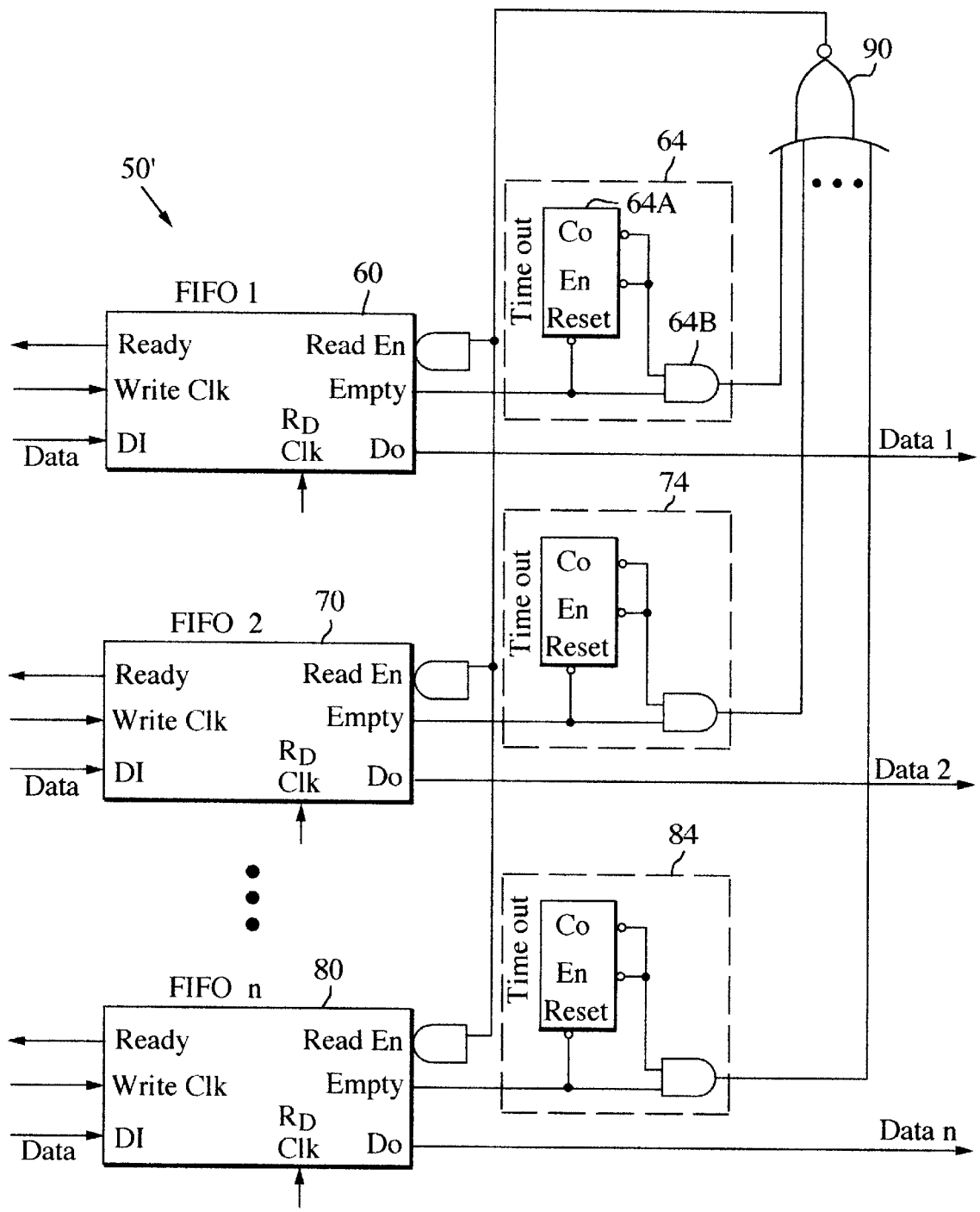
FIG. 1B is a circuit schematic illustrating an alternate embodiment of a microtiming logic in accordance with the invention.

FIG. 1B is a circuit schematic 50' illustrating an alternate embodiment of a microtiming logic technique in accordance with the invention. This logic circuit 50' includes a timeout mechanism to prevent a single source from locking the system by failing to send data. Particularly, the EMPTY signal from each FIFO device is processed by a timeout circuit, whose output is then ORed and inverted by NOR gate 90 to provide the READ ENABLE signal. After a predetermined timeout period, a continuous EMPTY signal may be overridden, and processing continues, based on the status of the remaining EMPTY signals.

In this exemplary embodiment, the timeout mechanism includes timeout circuits 64, 74, 84, respectfully connected between the EMPTY terminals of the FIFOs and the inputs to the NOR gate 90. The timeout circuits are identical. Exemplary circuit 64 includes a timeout counter 64A and an AND gate 64B. The timeout counter is started on EMPTY=1. The counters are clocked by the read clock. The terminal count port of the counter goes to 0 at timeout, and latches until the counter is reset. The counter 64A is reset on EMPTY=0. On the terminal count (last count state), EN is set to 0, which stops the counter. On reset, the counter clocks through its interval until the terminal count is reached.

Figure 3:
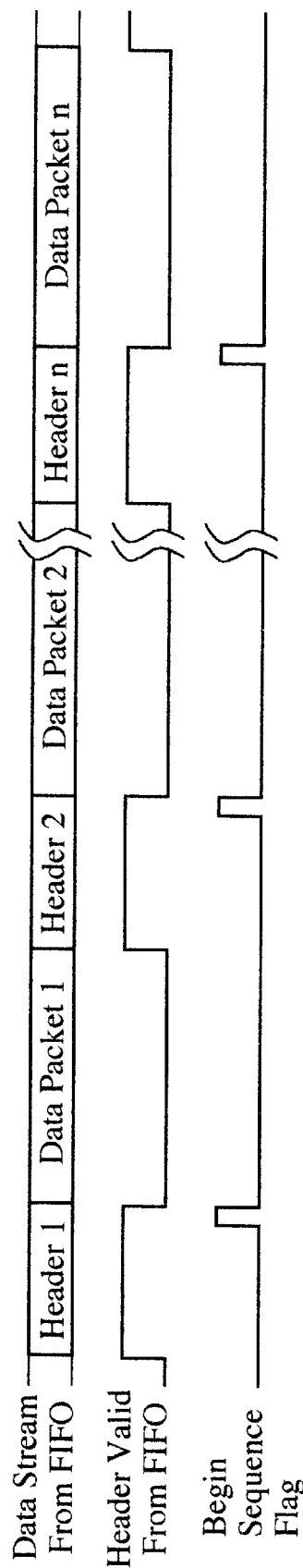
FIG. 3 shows a typical transmission of data as packets, each delineated by a header message denoting beginning and end of each data packet.

FIG. 2A illustrates schematically a circuit 100 for providing a macrotiming function in accordance with an aspect of the invention. A BEGIN SEQUENCE flag is encoded into the data from each source. This typically may be a field in a header. FIG. 3 shows a typical transmission of data as packets, each delineated by a header message denoting beginning and end of each data packet. In this case, the BEGIN SEQUENCE flag is the end of each header. The BEGIN SEQUENCE flags are decoded at the FIFO outputs. Thus, each of the FIFOs 60, 70, 80 has a flag decode circuit 102, 104, 106 connected to receive the data output from the FIFO. In this exemplary embodiment, the flag decode circuits recognize the respective BEGIN SEQUENCE flags as the end of the respective headers. The output of each flag decode circuit is passed through an inverter 108, 110, 112 to form an input to a respective OR gate 114, 116, 118. The output of each flag decode circuit is also connected as an input to AND gate 120, whose output is connected to an input of each OR gate 114, 116, 118. The AND gate 120 produces a logical high signal when all BEGIN SEQUENCE flags are active.

The logical operation of the circuit 100 is to stop readout of the FIFOs with active "BEGIN SEQUENCE" flags until all flags are active. Thus FIFO reads from FIFOs 60, 70, 80 begin on all FIFOs simultaneously on receipt of the final active flag, and all data are aligned. The FIFO readout enables are ANDed with the microtiming EMPTY enables to provide the FIFO READ ENABLE signals. Thus, the outputs from the OR gates 114, 116, 118, i.e. the FIFO readout enable signals, serve as one set of inputs 92B, 94B, 96B to the AND gates 92, 94, 96. Another set of inputs 92A, 94A, 96A is provided by the respective microtiming EMPTY enable signals.

FIG. 2B illustrates an exemplary circuit implementation 150 for providing a macrotiming function in accordance with an aspect of the invention, and which includes a timeout counter function to assure that the failure to receive the BEGIN SEQUENCE flag from a single source does not lock up the system. Logic detects when any n−1 flags are received, which initiates a timeout. At the end of timeout, READ ENABLE is activated, and readout proceeds, with n−1 sources aligned. Of course, instead of detecting when any n−1 flags are received, some other number of flags less than n flags could also be used to initiate a timeout.

The system 150 thus includes an n−1 detect circuit 122 connected to each of the flag decode circuits 102, 104, 106. The circuit 122 produces a logical high output on line 122A when any n−1 flags are active. This signal is inverted to provide a reset signal for the timeout counter 124. The $C_o$ port of the counter 124 is provided as an input to OR gate 126. The output of the AND gate 120, which is logical high when all n flags are active, is connected as another input to the OR gate. The output of the gate 126 is connected as an input to the respective OR gates 114, 116, 118, and the system is otherwise as shown in FIG. 2A. Once any n−1 flags are active, the timeout counter 124 is reset. Thereafter, once the counter times out, or all n flags become active, readout will be enabled.

Figure 4:
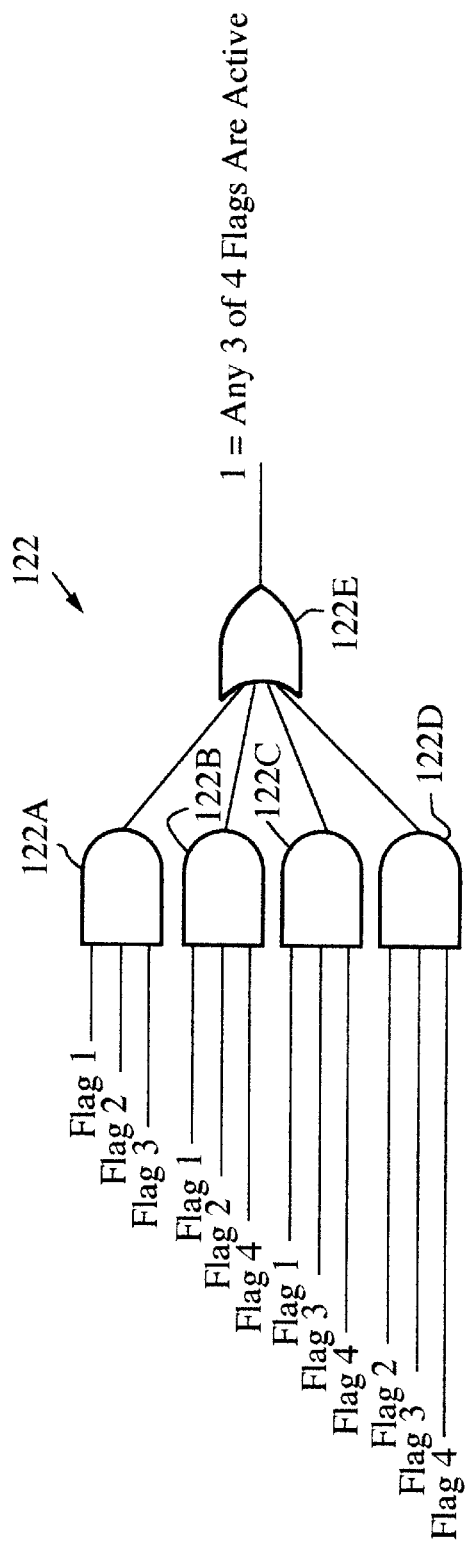
FIG. 4 shows an exemplary n−1 detect circuit suitable for use in the system of FIG. 2B.

FIG. 4 shows an exemplary n−1 detect circuit suitable for use as circuit 122, for the example of n=4. There are n unique combinations of n−1 flags, and each combination goes to the inputs of one of n AND gates 122A–122D. The outputs of the n AND gates are ORed at OR gate 122E. The resultant output is high when any combination of n−1 flags is present.

Figure 5:
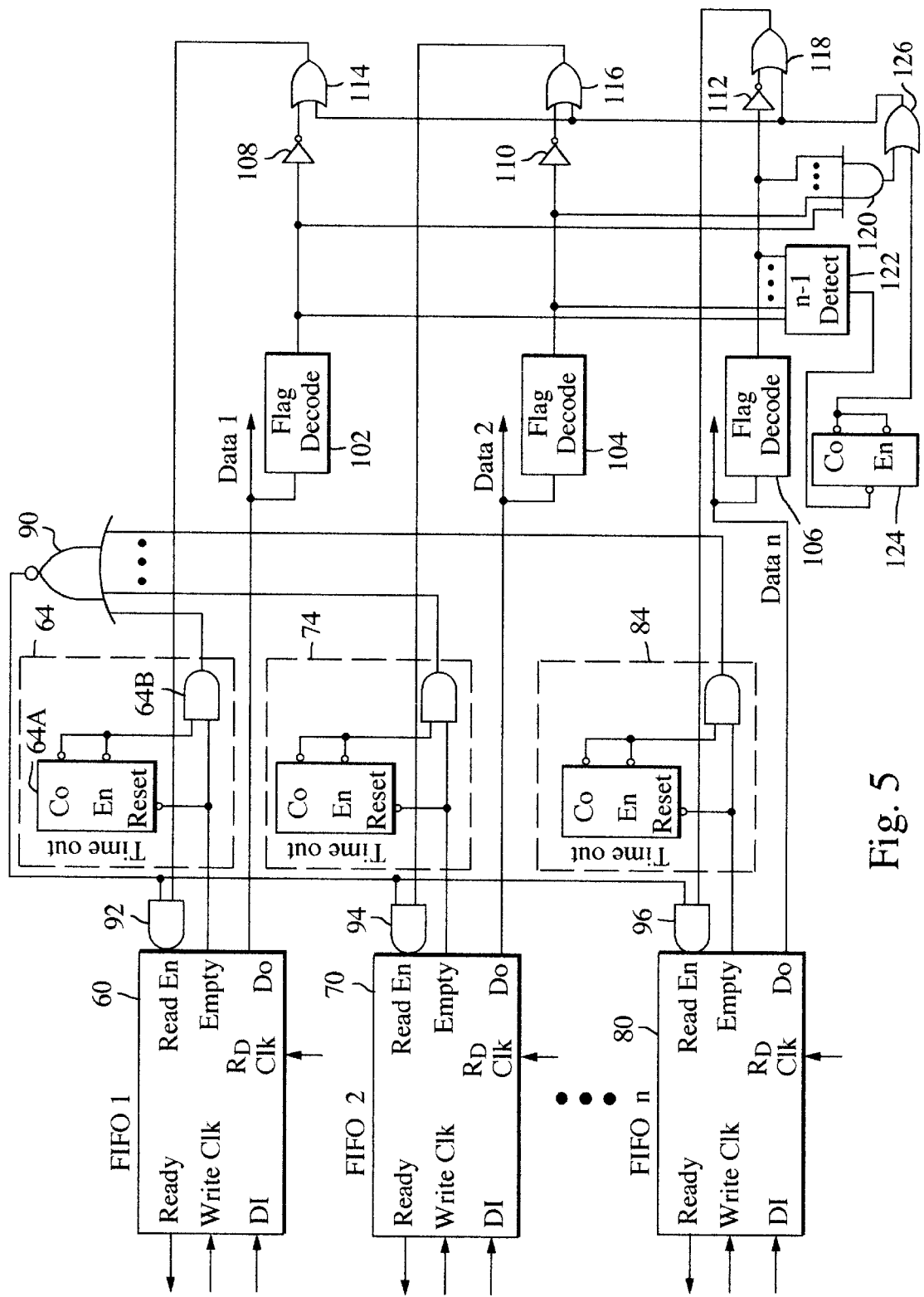
FIG. 5 is a schematic diagram of a system explicitly showing the microtiming and macrotiming functions.

FIG. 5 is a schematic diagram of a system explicitly showing the microtiming and macrotiming functions described above with respect to FIGS. 1A, 1B, 2A and 2B. Like reference characters are used to identify like elements in the figures.

It is understood that the above-described embodiments are merely illustrative of the possible specific embodiments that may represent principles of the present invention. Other arrangements may readily be devised in accordance with these principles by those skilled in the art without departing from the scope and spirit of the invention.

What is claimed is:

1. A method for converting input data from a multiplicity of data sources that are mutually asynchronous, to a single, common synchronous format, comprising:

receiving each asynchronous data input from said data sources in a respective first-in, first-out buffer (FIFO) device;

controlling the readout of data from the respective FIFO devices to provide a microtiming function to assure that sequential samples of data from said asynchronous data sources step together, one at a time out of their respective FIFOs without loss of registration, and to provide a macrotiming function to initially align a predetermined start point of a sequence of data among all of the data sources, comprising decoding a BEGIN SEQUENCE flag in the input data from each source, and disabling readout from each FIFO device until a BEGIN SEQUENCE flag for each input data source has been decoded.

2. The method of claim 1, wherein said step of controlling the readout of data from the respective FIFO devices to provide a microtiming function comprises:

determining when any one of the FIFO devices needs more input data to continue a readout, and stopping readout from all FIFO devices when any one of said FIFO devices needs more input data to continue the readout.

3. The method of claim 2, wherein said step of providing a microtiming function includes timing said stopping of said readout and continuing readout after a predetermined time has elapsed.

4. The method of claim 1, wherein said step of controlling the readout of data from the respective FIFO devices to provide a macrotiming function comprises:

determining when a predetermined number of said BEGIN SEQUENCE flags has been decoded and starting a time;

upon elapsement of a predetermined time interval, commencing said readout.

5. A system for converting input data sequences from a multiplicity of data sources that are mutually asynchronous, to a single, common synchronous format, comprising:

a set of first-in-first-out (FIFO) buffer devices, connected to receive said data input sequences from said data sources;

a control logic system for controlling readout of data from said FIFO buffer devices, said control logic system including macrotiming circuitry for aligning all data inputs to a predetermined point in data flow or processing sequence, and microtiming circuitry for maintaining clock-by-clock alignment of the input data sequences, wherein said microtiming circuitry comprises circuitry for determining when any one of the FIFO devices needs more input data to continue a readout, and stopping readout from all FIFO devices when any one of said FIFO devices needs more input data to continue the readout, and wherein said macrotiming circuitry comprises decoding circuitry for decoding a BEGIN SEQUENCE flag in the input data from each source, and circuitry for disabling readout from each FIFO device until a BEGIN SEQUENCE flat for each input data source has been decoded.

6. The system of claim 5, wherein said microtiming circuitry includes timeout circuitry for timing said stopping of said readout and continuing readout after a predetermined time has elapsed.

7. The system of claim 5, wherein said macrotiming circuitry further comprises:

timer circuitry for determining when a predetermined number of said BEGIN SEQUENCE flags has been decoded and starting a timer, and upon elapsement of a predetermined time interval, commending said readout.

8. A method for converting input data from a multiplicity of data sources that are mutually asynchronous, to a single, common synchronous format, comprising:

receiving each asynchronous data input from one of said data sources in a respective buffer device;

controlling the readout of data from the respective buffer devices to provide a microtiming function to assure that sequential samples of data from said asynchronous data sources are read out together from the respective buffer devices without loss of registration, and to provide a macrotiming function to initially align a predetermined start point of a sequence of data among all of the data sources, comprising decoding a BEGIN SEQUENCE flag in the input data from each source, and disabling readout from each buffer device until a BEGIN SEQUENCE flag for each input data source has been decoded.

9. The method of claim 8, wherein said step of controlling the readout of data from the respective buffer devices to provide a microtiming function comprises:

determining when any one of the buffer devices needs more input data to continue a readout, and stopping readout from all buffer devices when any one of said buffer devices needs more input data to continue the readout.

10. The method of claim 9, wherein said step of providing a microtiming function includes timing said stopping of said readout and continuing readout after a predetermined time has elapsed.

11. The method of claim 8, wherein said step of controlling the readout of data from the respective buffer devices to provide a macrotiming function comprises:

determining when a predetermined number of said BEGIN SEQUENCE flags has been decoded and starting a timer;

upon elapsement of a predetermined time interval, commending said readout.

* * * * *